US006454896B1

(12) United States Patent
Wexler

(10) Patent No.: US 6,454,896 B1
(45) Date of Patent: Sep. 24, 2002

(54) PROCESS FOR LAMINATING AN INK JET PRINT

(75) Inventor: Allan Wexler, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/498,514

(22) Filed: Feb. 4, 2000

(51) Int. Cl.[7] ......................... B44C 1/165; B32B 31/00; B41M 3/12

(52) U.S. Cl. ....................... 156/234; 156/247; 156/277; 156/289; 427/148; 428/914

(58) Field of Search ................................ 156/230, 247, 156/277, 289, 234, 241, 240, 231, 232, 233, 235, 236, 237, 238, 239; 427/146, 147, 148; 428/914

(56) References Cited

U.S. PATENT DOCUMENTS 5,242,739 A * 9/1993 Kronzer et al. ............. 428/195
5,387,573 A 2/1995 Oldfield et al.
5,662,976 A 9/1997 Popat et al.
5,714,305 A * 2/1998 Teng et al. .............. 430/271.1
5,928,989 A * 7/1999 Ohnishi et al. ............. 503/227
6,177,187 B1 * 1/2001 Niemoller et al. .......... 428/914
6,210,844 B1 * 3/2001 Sondergeld .................. 430/11

FOREIGN PATENT DOCUMENTS

WO WO 92/09930 * 6/1992

OTHER PUBLICATIONS

Modern Plastics Encyclopedia, Oct. 1983, McGraw–Hill, vol. 60, No. 10A, p. 14.*

* cited by examiner

*Primary Examiner*—Richard Crispino
*Assistant Examiner*—Kevin P. Shortsle
(74) *Attorney, Agent, or Firm*—Harold E. Cole

(57) ABSTRACT

A process for laminating an ink jet print by providing a support having an ink jet image, contacting the imaged surface with a transfer element to form a composite, the transfer element comprising a flexible, polymeric support having a porous, fusible, transferable protection layer comprising fusible, thermoplastic polymeric particles in a polymeric binder, the protection layer having a thickness between 2 and 100 $\mu$m and a particle-to-binder ratio between 95:5 and 70:30, the thermoplastic polymeric particles having a particle size less than 10 $\mu$m and a Tm or softening point greater than 50° C., and the polymeric binder having a Tg less than 20° C., applying heat and pressure to the composite to fuse the protection layer to form a substantially continuous protection layer, allowing the composite to cool, and peeling the polymeric support of the transfer element from the composite to form the laminated ink the print.

8 Claims, No Drawings

PROCESS FOR LAMINATING AN INK JET PRINT

CROSS REFERENCE TO RELATED APPLICATION

Reference is made to commonly-assigned, copending U.S. patent application Ser. No. 09/498,575, filed of even date herewith, of Wexler, entitled "Transfer Laminating Element," the teachings of which are incorporated herein by reference.

FIELD OF THE INVENTION

This invention relates to an process for laminating ink jet prints with a porous, fusible, transferable protection layer.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof a base layer for absorbing fluid and an ink-receiving or image-forming layer, and includes those intended for reflection viewing, which have an opaque support, and those intended for viewing by transmitted light, which have a transparent support.

Ink jet prints prepared by printing onto ink jet recording elements are subject to environmental degradation such as water smearing and light fade. For example, since ink jet dyes are water-soluble, they can migrate from their location in the ink-receiving layer when water comes in contact with the recording element after imaging.

To reduce the vulnerability of prints to degradation and to enhance gloss, ink jet prints are often laminated. Typically, such conventional lamination is a process whereby a continuous polymeric film bearing an adhesive is brought into contact with the surface of the print. Heat and/or pressure is then used to affix the continuous polymeric film to the print surface. The continuous polymeric film then serves as a barrier layer that is impermeable to water and further acts to diminish the fading of the print image caused by light.

However, there is a problem with prior art laminating films since they are typically supplied in roll format and must be cut, or less desirably torn, to separate the laminated print from the continuous roll of laminating film. A requirement to cut adds expense to a laminator design that is required to run in a continuous mode.

U.S. Pat. No. 5,662,976 discloses an assembly for creating laminated cards which comprises a sheet of card stock with a release coating and a sheet of laminating film adhering to the release coating. A card form is cut into the sheet of card stock, and a lamination strip, which is sufficiently large to fold over so as to laminate both surfaces of the card, is cut into the lamination sheet. After printing, the card and the lamination strip are removed, and the lamination strip folded over to laminate the card. However, there is a problem with this laminating film in that expensive cutting and perforating steps are required to prepare the laminated card.

U.S. Pat. No. 5,387,573 discloses a dye-donor element for thermal dye transfer comprising a support and a transferable protection layer wherein the transferable protection layer is less than about 1$\mu$ thick and contains particles in an amount of up to about 75% of the transferable protection layer. However, there is no disclosure in this patent that the protection layer can be used with ink jet prints.

It is an object of the invention to provide a process for laminating ink jet prints wherein the protection layer is sufficiently thick to protect ink jet images from degradation by water, and yet can be employed without resort to expensive cutting steps. It is another object to provide a process for laminating an ink jet print of arbitrary geometric shape. It is still another object to provide a process that allows for the direct visual distinction between laminated and unlaminated regions of the print.

SUMMARY OF THE INVENTION

These and other objects are provided by the present invention which comprises a process for laminating an ink jet print comprising:

a) providing an ink jet print comprising a support having thereon an ink jet image;

b) contacting the imaged surface of the ink jet print with a transfer laminating element to form a composite, the transfer laminating element comprising a flexible, polymeric support having thereon a porous, fusible, transferable protection layer comprising fusible, thermoplastic polymeric particles in a polymeric binder, the protection layer having a thickness of between about 2 and about 100 $\mu$m and a particle-to-binder ratio of between about 95:5 and about 70:30, the thermoplastic polymeric particles having a particle size of less than about 10 $\mu$m and a Tm or softening point of greater than about 50° C. and the polymeric binder having a Tg of less than about 20° C.;

c) applying heat and pressure to the composite to fuse the porous, fusible, transferable protection layer to form a substantially continuous protection layer;

d) allowing the composite to cool; and e) peeling the flexible, polymeric support of the transfer laminating element from the composite to form the laminated ink jet print.

In using the process of the invention where the transfer laminating element is larger in area than the ink jet print, the area of the transfer laminating element containing unfused, porous, fusible, transferable protection layer can be separated from the area of the fused protection layer protecting the ink jet print without the need for cutting. When the porous, fusible, transferable protection layer fuses, it becomes a substantially continuous film which is optically clear and can be readily distinguished from the unfused area.

DETAILED DESCRIPTION OF THE INVENTION

As noted above, the particle-to-binder ratio in the protection layer is between about 95:5 and about 70:30. If the particle-to-binder ratio is above the range stated, the layer will not have any cohesive strength. If the particle-to-binder ratio is below the range stated, the layer will not be porous, and on peeling the support away from the cooled composite after laminating, a continuous film is present which must be cut.

It is believed that when a fusible, transferable protection layer is used which is porous, cutting is obviated by the weak cohesive strength at the interface between the area of the substantially continuous film formed on fusing and the unfused, porous area. Thus, the interface acts as a microperforated edge of the film that facilitates a clean rupture. Further, during the fusing step, otherwise entrained air escapes via the interface between the substantially continuous film and the unfused, porous area.

The polymer used to make the fusible, thermoplastic polymeric particles employed in the invention may be an amorphous polymer which has softening point greater than about 50° C., such as an amorphous polyester, e.g., Kao C® (Kao Corp.) or an acrylic polymer such as Carboset 526® (B F Goodrich Specialy Chemicals); or a partially crystalline polymer having a Tm greater than about 50° C., such as a partially crystalline polyester, e.g., Griltex Polyester® (EMS American Grilon Corp) or an ethylene-vinyl acetate copolymer such as Elvax® (DuPont Corp.); or a thermoplastic, modified cellulose such as Ethocel® (Dow Chemical Co.), etc. In a preferred embodiment, the fusible, thermoplastic polymeric particles are made from an amorphous polyester having a silica shell. In another preferred embodiment, the fusible, thermoplastic polymeric particles contain a UV-absorber.

The fusible, thermoplastic polymeric particles used in the invention may be made using various techniques, such as, for example, evaporative limited coalescence as described in U.S. Pat. No. 4,833,060, limited coalescence as described in U.S. Pat. No. 5,354,799, grinding as described in U.S. Pat. No. 4,304,360, or cryogenic grinding as described in U.S. Pat. No. 4,273,294.

As noted above, the polymer used to make the fusible, thermoplastic particles will have a Tm or softening point greater than about 50° C., preferably between about 60° C. and 150° C. The Tm is measured using a differential scanning calorimeter (DSC). In a preferred embodiment, the Tm is between about 60° C. and 120° C. A softening point of a polymer can be measured by the Ring and Ball method as described in ASTM E28. In addition, the polymer used to make the fusible, thermoplastic particles usually will have a Tg of less than about 100° C., preferably between about 0° C. and 90° C.

As noted above, the polymeric binder used in the invention has a Tg of less than about 20° C., preferably between −60° C. and 20° C. The polymeric binder used in the invention may be, for example, a polyurethane such as a Witcobond® Aqueous Urethane Dispersion (Witco Corp.), a vinyl acetate-ethylene copolymer emulsion, an ethylene-vinyl chloride copolymer emulsion, a vinyl acetate-vinyl chloride-ethylene terpolymer emulsion such as Airflex® (Air Products Corp.), or an acrylic emulsion such as Flexbond® (Air Products Corp). In a preferred embodiment, the binder comprises a polyurethane.

A subbing/release layer may also be used to provide adhesion between the porous, fusible, transferable protection layer and the support. The subbing/release layer must be capable of initially adhering the protection layer to the support and must be capable of subsequently releasing the protection layer from the support upon application of heat and pressure followed by cooling. Any material that performs this adhesion/release function can be used. In general, a coated subbing/release layer has a final coating weight of about 90 mg/m$^2$. Suitable materials include, for example, lattices such as a terpolymer latex of acrylonitrile, vinylidene chloride and acrylic acid, or partially hydrolyzed vinyl chloride-vinyl acetate copolymers. Alternatively, a subbing/release layer can be generated directly on the support surface by corona-discharge-treatment of the support prior to applying the porous, fusible, transferable protection layer.

As the flexible, polymeric support used in the invention, there may be used, for example, various plastics including a polyester-type resin such as poly(ethylene terephthalate), poly(ethylene naphthalate), polycarbonate resins, polystyrene resins, polysulfone resins, methacrylic resins, cellophane, acetate plastics, cellulose diacetate, cellulose triacetate, vinyl chloride resins and polyester diacetate. The thickness of the support may be, for example, from about 12 to about 500 $\mu$m, preferably from about 75 to about 300 $\mu$m. In a preferred embodiment, the support is a transparent poly(ethylene terephthalate) film.

Since the transfer lamination element may come in contact with other image recording articles or the drive or transport mechanisms of laminating devices, additives such as surfactants, lubricants, matte particles and the like may be added to the element to the extent that they do not degrade the properties of interest.

The protection layer described above may be coated by conventional coating means onto the support such as wound wire rod coating, slot coating, slide hopper coating, gravure, curtain coating and the like.

Ink jet inks used to prepare the images to be laminated by the transfer lamination element used in the invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the elements disclosed herein have been referred to primarily as being useful for laminating ink jet prints, they also can be used to protect images created employing other technologies such as photographic prints, laser printer prints, prints made via offset lithography and the like.

The following examples further illustrates the invention.

EXAMPLES

Example 1

Lamination Test

Preparation of Thermoplastic Polymeric Particles

To 225 g ethyl acetate was added 22.5 g of Kao C® polyester resin and 2.5 g UV absorber Escalol® 597 (ISP Corp.) and stirred to solution. Separately, an aqueous solution was prepared of 375 g pH 4 buffer, 21 g Ludox TM® colloidal silica (DuPont Corp.), and 4.5 g of 10% poly (adipic acid-co-methylaminoethanol). The aqueous phase was placed in a Silverson mixer, the organic phase was added and emulsified at 3,000 rev/min for one minute. The emulsion was then passed through a Microfluidizer (Microfluidics Manufacturing model 110T) to further reduce the emulsion droplet size. After evaporating the ethyl acetate, there was obtained a narrowly distributed population of silica coated polyester beads, $\mu$=3.0+/−0.36 $\mu$m, with incorporated UV absorber. Sufficient water was decanted to give a dispersion with 30% solids.

Coating Solutions

A series of coating solutions at 24% solids were prepared, at the particle-to-binder ratios shown in Table 1, by mixing the above polyester particles and a polyurethane binder, Witcobond® 215, a 35% aqueous polyurethane dispersion.

Solution 1 of the Invention (Particle:Binder 90:10)

14.4 g of thermoplastic polymeric particles, 1.37 g of binder and 4.23 g of deionized water were mixed together to form a coating solution with a particle-to-binder ratio of 90:10.

Solution 2 of the Invention (Particle:Binder 75:25)

12.0 g of thermoplastic polymeric particles, 3.43 g of binder and 4.57 g of deionized water were mixed together to form a coating solution with a particle-to-binder ratio of 75:25.

Control Solution 1 (Particle:Binder 50:50)

8.0 g of thermoplastic polymeric particles, 6.86 g of binder and 5.14 g of deionized water were mixed together to form a coating solution with a particle-to-binder ratio of 50:50.

Control Solution 2 (Particle:Binder 25:75)

4.0 g of thermoplastic polymeric particles, 10.28 g of binder and 5.72 g of deionized water were mixed together to form a coating solution with a particle-to-binder ratio of 25:75.

Control Solution 3 (Particle:Binder 5:95)

0.8 g of thermoplastic polymeric particles, 13.03 g of binder and 6.17 g of deionized water were mixed together to form a coating solution with a particle-to-binder ratio of 5:95.

Coating

Each of the above solutions were coated on 100$\mu$ thick, poly(ethylene terephthalate) support using a wire wound rod, calibrated to give a wet laydown of 120$\mu$. The support had been previously subbed with a terpolymer latex of acrylonitrile, vinylidene chloride and acrylic acid. The coatings were air dried forming Elements 1 and 2 of the invention with an unfused porous layer thickness of 57$\mu$, and non-porous Control Elements 1–3 with a layer thickness of 30$\mu$. All the elements were then cut to give 9.5 cm wide by 28 cm long segments.

Lamination Test

Ink jet images for lamination testing were printed on an ink jet receiver consisting of a resin-coated paper receiver with an 102 mg/m$^2$ ink receiving layer, comprised of 75% gelatin, 15% polyvinylpyrrolidone and 10% of a cationic latex mordant. After imaging, a 9.5 cm wide by 28 cm long segment was cut from the receiver. The protection layer of each of the above elements was then contacted with the ink jet image and laminated by passing through the nip of a pair of heated rollers. Laminating speed was 46 cm/minute, with the upper roller at 150° C. and at nip pressure of 0.41 MPa.

Only 10 cm of the 28 cm long segments, corresponding to the length of the image, were passed into the nip. The fused composites were allowed to cool to room temperature, and the support was then peeled away from the fused composite. After fusing, the transferred protection layers from porous Elements 1 and 2 of the invention, having been compressed under heat and pressure, formed a 34$\mu$ thick non-porous continuous layer.

The same size image was also laminated with a 75$\mu$ thick commercial laminating film, Seal ThermaShield R® (Hunt Graphics Americas Co.) to provide an additional Element, Control 4.

The elements were then evaluated for peel. Peel ratings from 1 to 5 are listed below. A peel rating of 1 corresponds to a continuous film that extends beyond the edge of the fused area and must be cut to separate it from the image, i.e., failure. A rating of 5 corresponds to a clean break at the interface. The following results were obtained:

TABLE 1

| Element | Particle/ Binder Ratio | Peel Rating | Comment |
|---|---|---|---|
| 1 | 90/10 | 5 | Clean break at interface |
| 2 | 75/25 | 4 | Breaks at interface |
| Control 1 | 50/50 | 1 | Continuous film that requires cutting |
| Control 2 | 25/75 | 1 | Continuous film that requires cutting |
| Control 3 | 5/95 | 1 | Continuous film that requires cutting |
| Control 4 | 0/100 | 1 | Continuous film that requires cutting |

The above results show that costly cutting steps can be eliminated using the transfer laminating element employed in the process of the invention.

Example 2

(Arbitrary Shaped Lamination Without Cutting)

Circular images having a 4.4 cm diameter were printed on commercial Kodak photographic ink jet media using a Hewlett Packard 895 printer. The transfer laminating Element 1 prepared above was placed on top of the circular image. A 5.1 cm diameter circular steel disk heated to 150° C. was placed on the laminating element, centered over the image, and pressed at about 0.70 MPa for ten seconds. After cooling, the laminating element was peeled from the composite, leaving a fused circular film layer over the circular ink jet image.

The above process was repeated using Control Elements 1–4 described above. However, they could not be separated from the circular image without cutting.

This example shows that the laminating element employed in the process of the invention can be used to deposit protective layers in varying geometrys without requiring a cutting step.

Example 3

(Waterfastness of the Transferred Protection Layer)

A pair of ink jet images was printed using each of five commercially available ink jet printers on commercially available Kodak photographic quality ink jet paper. One member of the pair was then contacted with Element 1 of the invention and passed through the nip of a pair of rollers. The other image was not laminated. Laminating speed was 46 cm minute, with the upper roller at 150° C. and at nip pressure of 0.41 MPa. The composite was allowed to cool. Peeling easily separated the support layer of the transfer laminate from the composite to afford a laminated image.

Waterfastness and Smudge Tests

With the prints laying image side up and on a flat surface, one drop of water was placed near the left edge of the print and 2.54 cm from the top edge. Likewise, a drop was place near the right edge of the print and 2.54 cm from the top. After a minute exposure to the water drops, the right drop is wiped with a Kim Wipe® using light pressure (smudge test) and immediately afterward the print is turned upright allowing the water drop on the left side to run to the bottom of the print (drip test). The tested prints are hung and allowed to dry. They are then rated on a subjective scale ranging from 1—No visible smearing or running to 5—Catastrophic running and/or smearing (image ruined) and reported below.

TABLE 2

| Laminated | Printer | Smudge | Drip |
|---|---|---|---|
| Yes | HP 895 | 1 | 1 |
| No | HP 895 | 5 | 5 |
| Yes | Epson 900 | 1 | 1 |
| No | Epson 900 | 5 | 5 |
| Yes | Lexmark 5700 | 1 | 1 |
| No | Lexmark 5700 | 5 | 5 |
| Yes | Canon 4400 | 1 | 1 |
| No | Canon 4400 | 5 | 5 |

The above results show that the polymeric particles fuse and transfer to form a continuous protective layer which functions as a barrier to effectively resist water penetration into the ink jet prints.

This invention has been described with particular reference to preferred embodiments thereof but it will be understood that modifications can be made within the spirit and scope of the invention.

What is claimed is:

1. A process for laminating an ink jet print comprising:

a) providing an ink jet print comprising a support having thereon an ink jet image;

b) contacting the imaged surface of said ink jet print with a transfer laminating element to form a composite, said transfer laminating element comprising a flexible, polymeric support having thereon a porous, fusible, transferable protection layer comprising fusible, thermoplastic polymeric particles in a polymeric binder, said protection layer having a thickness of between about 2 and about 100 $\mu$m and a particle-to-binder ratio of between about 95:5 and about 70:30 on a weight basis, said thermoplastic polymeric particles having a particle size of less than about 10 $\mu$m and a Tm or softening point of greater than about 50° C. and said polymeric binder having a Tg of less than about 20° C., said porous, fusible, transferable protection layer being capable of forming a substantially continuous film which is optically clear upon the application of heat and pressure, said transfer laminating element being larger in area than said ink jet print;

c) applying heat and pressure to said composite to fuse said porous, fusible, transferable protection layer to form a substantially continuous protection layer which is optically clear;

d) allowing said composite to cool; and e) peeling said flexible, polymeric support of said transfer laminating element from said composite so that the area of said transfer laminating element containing unfused, porous, fusible, transferable protection layer is separated from the area of said fused protection layer protecting said ink jet print without the need for cutting, thereby forming said laminated ink jet print.

2. The process of claim 1 wherein a subbing/release layer is present between said flexible, polymeric support and said protection layer, said subbing/release layer being capable of initially adhering said protection layer to said flexible, polymeric support and being capable of subsequently releasing said protection layer from said flexible, polymeric support upon application of heat and pressure followed by cooling.

3. The process of claim 1 wherein said flexible, polymeric support is poly(ethylene terephthalate).

4. The process of claim 1 wherein said fusible, thermoplastic polymeric particles comprise an amorphous polyester, a partially crystalline polyester, an acrylic polymer, an ethylene-vinyl acetate copolymer or a thermoplastic, modified cellulose.

5. The process of claim 1 wherein said fusible, thermoplastic polymeric particles comprise an amorphous polyester having a silica shell.

6. The process of claim 1 wherein said fusible, thermoplastic polymeric particles contain a UV-absorber.

7. The process of claim 1 wherein said polymeric binder is a polyurethane, a vinyl acetate-ethylene copolymer, an ethylene-vinyl chloride copolymer, a vinyl acetate-vinyl chloride-ethylene terpolymer or an acrylic polymer.

8. The process of claim 1 wherein said polymeric binder is a polyurethane.

* * * * *